United States Patent
Buys et al.

[11] 3,787,087
[45] Jan. 22, 1974

[54] VEHICLE HAVING TILTABLE CABIN AND ACTUATING DEVICE THEREFOR

[75] Inventors: Pieter Buys, Hengelo-O; Lambertus Sonneborn, Oldenzaal, both of Netherlands

[73] Assignee: Applied Power Industries, Inc., Milwaukee, Wis.

[22] Filed: May 1, 1972

[21] Appl. No.: 249,352

[30] Foreign Application Priority Data
Aug. 31, 1971 Netherlands .................. 7111991

[52] U.S. Cl. ............... 296/28 C, 91/454, 180/89 A, 254/93 R
[51] Int. Cl. ............................................ B62d 27/06
[58] Field of Search ... 296/28 C; 180/89 A; 91/454; 254/93 R

[56] References Cited
UNITED STATES PATENTS

| | | |
|---|---|---|
| 3,472,547 | 10/1969 | London .......................... 296/28 C |
| 3,404,868 | 10/1968 | Belongia et al. .................. 254/93 R |
| 2,821,877 | 2/1958 | Swanson .......................... 91/454 X |
| 1,876,023 | 9/1932 | Rosenberry ...................... 91/454 X |
| 2,618,122 | 11/1952 | Gratzmuller ...................... 91/454 X |
| 3,449,910 | 6/1969 | Reynolds .......................... 254/93 X |
| 2,210,519 | 8/1940 | Wollensak ........................ 180/89 A |
| 2,306,348 | 12/1942 | Spear ............................... 180/89 A |

*Primary Examiner*—Kenneth H. Betts
*Assistant Examiner*—Leslie J. Paperner
*Attorney, Agent, or Firm*—James E. Nilles

[57] ABSTRACT

A vehicle such as a truck having a cabin which is pivoted about a horizontal, transverse axis, and hydraulically operated means for tilting the cabin. The hydraulically operated means has an integral hand operated pump which is arranged and positioned to provide a simple, efficient and easily operated device.

6 Claims, 6 Drawing Figures

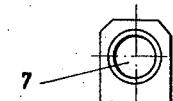
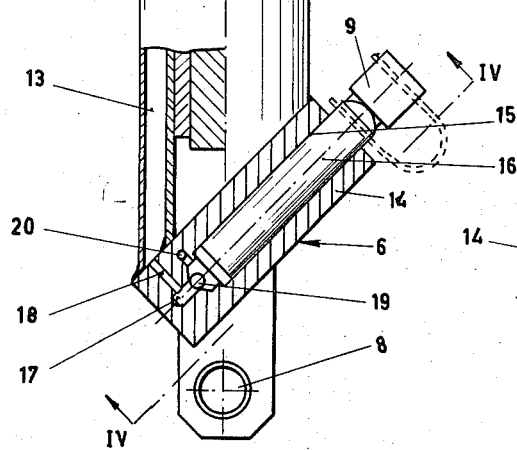
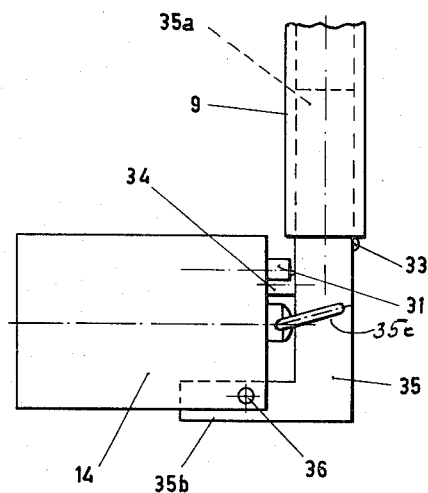

3,787,087

VEHICLE HAVING TILTABLE CABIN AND ACTUATING DEVICE THEREFOR

BACKGROUND OF THE INVENTION

This invention pertains to vehicles such as trucks which have a tiltable cabin. The cabin is mounted above the front wheels of the vehicle and has wheel chambers or fenders swingable with the cabin. The cabin is pivotally mounted for swinging about a generally horizontal and transverse axis located in front of the front wheels and thereby easy access to the engine for inspection and repair is provided.

In larger or heavier tiltable cabins, such as those having sleeping accommodations, the cabin may be tilted by a hydraulic cylinder unit and a separate plunger pump for actuating the unit, and these actuating devices are relatively expensive, such as in the U. S. Pat. No. 3,472,547 issued Oct. 14, 1969 to H. G. London and entitled "Safety Tilt System." Other vehicles of this type utilize a mechanical tilting device incorporating torsion bars or the like.

SUMMARY OF THE INVENTION

The present invention provides a vehicle having a tiltable cabin which is swingable about a generally horizontal and transverse axis located forwardly of the front wheels. The swingable cabin includes fenders or wheel chambers so that complete accessibility to the engine is provided when the cabin is swung about its axis. The invention provides an improved hydraulic cylinder and piston arrangement and which has an integrally formed plunger pump secured to the cylinder and forming one end thereof, the pump being located between the pivot point of the cylinder and the piston slideable therein. Suitable suction and pressure passages are provided for the fluid in the pump body and communicate directly with the interior of the cylinder and also communicate with an annular reservoir surrounding the cylinder.

The hydraulic cylinder and piston provided by the present invention is considerably simplified in comparison with prior art devices, and is a single, integral unit which is compact and relatively low in price.

The actuating rod provided for the pump is pivotally connected to the pump body in such a manner that the rod is swingable in a plane extending at an acute angle with the longitudinal axis of the cylinder and piston. The cylinder and piston are mounted with their longitudinal axis in the longitudinal direction of the vehicle, and the pump actuating rod extends laterally and outwardly from the wheel chamber in such a manner that the space in the chamber can be used for the necessary movement of the pump actuating rod. The pump actuating rod is movable in the plane containing the longitudinal axis of the hydraulic cylinder and piston.

BRIEF DESCRIPTION OF THE DRAWINGS

FIG. 3 is an enlarged view of the actuating device shown in FIGS. 1 and 2, portions being shown as broken away or in section for the sake of clarity;

FIG. 4A is an enlarged, fragmentary view of a portion of the device shown in FIG. 3, the view being taken generally along IV—IV in FIG. 3;

FIG. 4B is a view similar to FIG. 4A but showing the actuating rod in the relief valve actuating position;

DESCRIPTION OF A PREFERRED EMBODIMENT

Figure 1:
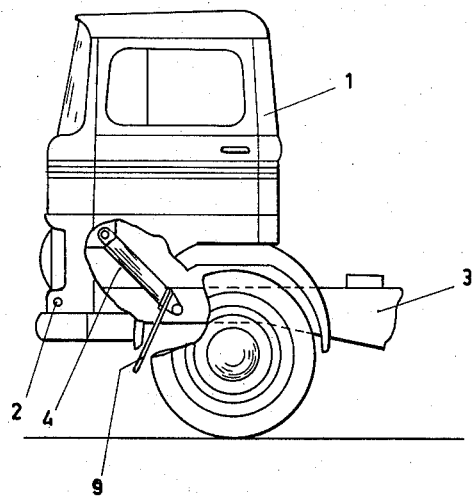
FIG. 1 is a schematic side elevational view of a front portion of the vehicle embodying the present invention and with the tiltable cabin in the normal operating position, certain parts being shown as broken away for the sake of clarity.
Figure 2:
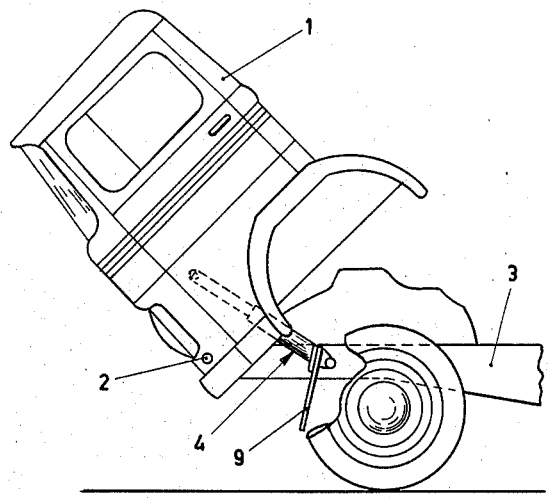
FIG. 2 is a view similar to FIG. 1 but showing the cabin in a forwardly tipped direction.

The vehicle such as the truck shown partially in FIGS. 1 and 2 is provided with a tiltable cabin 1 which is mounted to the truck frame 3 on a horizontal axis 2 situated at the front of the truck.

In order to permit tilting the cabin 1 forward (FIG.2) and back again to the normal operative position (FIG. 1), an actuating device 4 is provided and which comprises a cylinder-piston device 5 including a pump 6 secured to the cylinder end remote from the plunger(-FIG.3).

Figure 5:
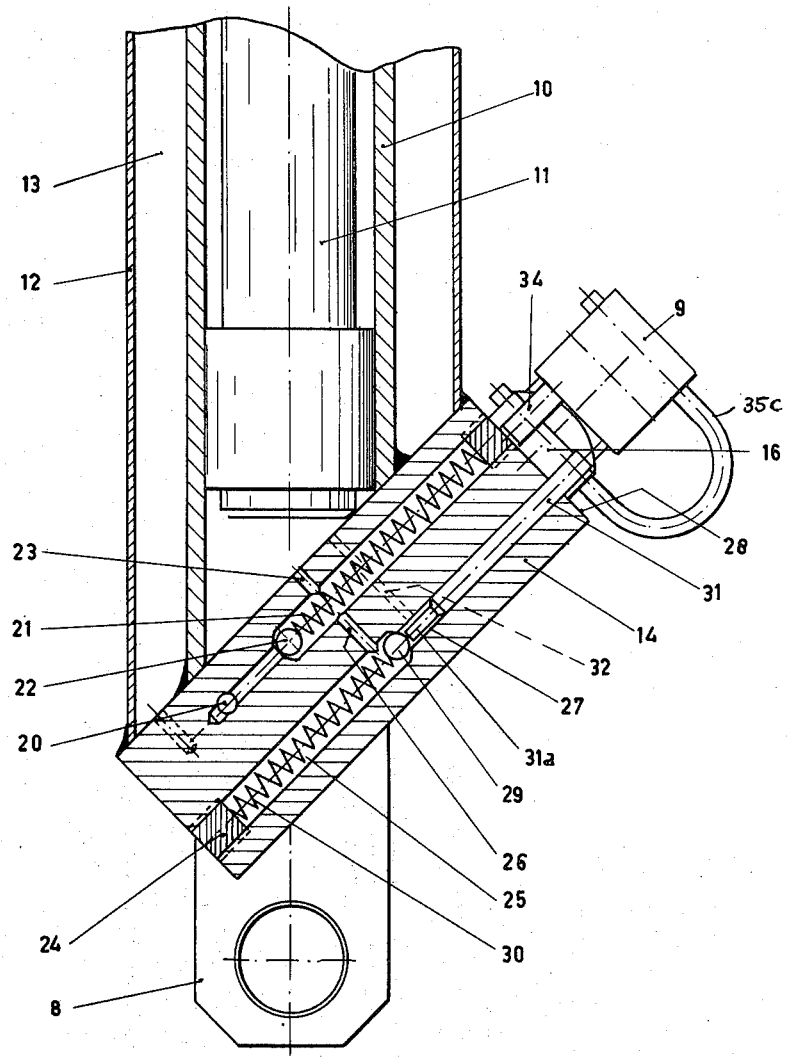
FIG. 5 is an enlarged, cross sectional view of a portion of the device shown in FIG. 3, but the view through the pump body being taken in a different plane from that cross sectional view in the FIG. 3 plane.

The actuating device 4 which will be described more in detail with reference to FIGS. 3–5 is positioned with its longitudinal axis in a plane parallel to the longitudinal axis of the vehicle and is connected with its piston rod end formed as a pivot eye 7 pivotably to the cabin 1 and with its cylinder end likewise in the form of a pivot eye 8 pivotally to the truck frame 3.

The actuating device 4 extends with its plunger end 7 obliquely in forward direction, under an angle of about 45° with regard to the horizontal plane. The actuating device 4 may be actuated through the intermediary of the pump actuating rod 9 extending in the wheel chamber of the front wheel shown in the drawing and which is well accessible in said necessarily spacious wheel chamber and may be actuated with a relatively large freedom of movement. It appears from a comparison between the normal operative position according to FIG. 1 and the position tilted through an angle of about 45° in forward direction according to FIG. 2, that the longitudinal axis of the actuating device 4 when tilting the cabin 1 forwardly through about 45°, is tilted only through a relatively small angle so that the position of the pump actuating rod 9 is not substantially changed when tilting the cabin in forward direction.

The cylinder-piston 5 of the actuating device 4 shown in detail in FIGS. 3–5 comprises the cylinder 10 in which the piston 11 is mounted slideable inwardly and outwardly. The cylinder 10 is surrounded by a jacket 12 defining with the cylinder 10 an annular reservoir 13 for the hydraulic liquid. The reservoir 13 as well as the cylinder 10 are at the bottom end defined by the generally disc-shaped body 14 of the pump 6 secured to the cylinder-piston 5 in oblique position relative to the axis of said device. The pump body 14 contains a bore 15 which receives the pump plunger 16. The bore 15 ends in a narrower bore 17 connected to the supply reservoir 13 through the suction passage 18. The transition portion between the bores 15 and 17 forms a seat for the ball type suction valve 19 (FIG. 3). The bore 15 communicates via a passage 20 with a bore 21 (FIG. 5) in which a seat for the ball shaped pressure valve 22 has been provided. The bore 15 communicates via valve 22 with a pressure passage 23 opening into the chamber of cylinder 10.

The pump body 14 further comprises a bore 25 (FIG. 5) closed from the outside by a plug 24, which bore communicates through a lateral passage 26 (provided as a continuation of the pressure passage 23) with the bore 21. Bore 25 then continues as a narrower bore 27 which opens into the end wall surface 28 of the pump body remote from the plug 24. A relief valve 29 abuts against a seat formed by the shoulder between bore 25 and 27, and this valve 29 is normally kept closed by a spring 30 in the bore 25. However, the valve 29 may be lifted from its seat, against the force of said spring, by the reduced end 31a of a relief pin 31 slideably guided in the bore 27, and which pin has an end extending outwardly from said bore. The portion of the bore 27 containing the reduced relief pin end 31a communicates with the reservoir 13 through a bore 32.

The pump actuating rod 9 is pivotally connected by a right angle lever 35 (FIGS. 4A and 4B to the pump body as at 36. Link 35c pivotally connects the lever 35 to the outwardly projecting end of the plunger 16. More specifically, the rod 9 is removably slide onto one leg 35a of said lever, the second leg 35b of said lever being journalled pivotally around a pin 36 in a recess of the pump body 14 (see FIGS. 4A and 4B). In FIG. 4A, the pump actuating rod 9 is shown in its normal operative position in which position the rod 9 engages with its end edge an abutment 33 on the leg 35a of the lever 35. In this position moving the pump actuating rod 9 upwardly and downwardly from the innermost pump plunger position according to FIG. 4A will effectuate the normal pump operation.

The pump actuating rod 9 may be slid past the abutment 33 on the lever leg 35a by exerting a certain pushing force to it, namely up to a second abutment 34 which at the same time serves as an abutment limiting the compression stroke of the pump. The end edge of the pump actuating rod 9 passes beyond the end of the relief pin 31 projecting beyond the pump wall surface 28 whereby said pin is pushed inwardly through a certain length (see FIG. 4B). As a result thereof the relief valve 29 is lifted from its seat so that the cylinder chamber of the plunger-cylinder device 5 is connected through the pressure passage 23, the bore 21, the connecting passage 26, the bore 25, the open valve 29, the bore 27 and the connecting bore 32 (FIG. 5) to the reservoir 13 so that the said cylinder chamber is relieved. In this manner one may return the actuating device from its extended position to its retracted position corresponding to the normal operative position of the cabin, namely by a very simple operation of one and the same actuating rod 9. When not in use the actuating rod 9 may further be easily removed from the actuating device 4 and stored.

We claim:

1. A vehicle having a frame, a tiltable cabin pivotally mounted on said frame about a generally horizontal and transverse axis adjacent a forward end of said frame, an actuating device for swinging said cabin about said axis and including a hydraulic cylinder and a piston slideable in said cylinder, a jacket surrounding said cylinder and forming an annular fluid reservoir with said cylinder, said cylinder pivotally connected to said frame, said piston rod being pivotally connected to said cabin, a plunger pump rigidly connected to said cylinder and located between said piston and the point of pivotal connection of said cylinder to said frame, said plunger pump including a body secured across said cylinder and closing the end thereof having a bore therein, a plunger slideably mounted in said bore and having an end extending from said bore, suction and pressure passages formed in said body and connecting said bore with said interior of said cylinder and with said reservoir, a pump actuating rod pivoted at one end on said device and also connected intermediate its length with said pump plunger end, said actuating rod being swingable in a plane extending at an acute angle with the longitudinal axis of the hydraulic cylinder and piston, said cabin having a ground wheel chamber, and said actuating device being mounted on said frame with said pump actuating rod extending into said wheel chamber.

2. The vehicle set forth in claim 1 further characterized in that said rod including a permanent portion pivotally connected to said pump body and to said pump plunger end, said rod also including an extension rod which is slideably received on said permanent portion.

3. The vehicle as described in claim 2 including a normally closed relief valve in said body, said extension rod is shiftable on said permanent portion between a first, normal pump operating position and a second position in which said extension rod actuates said relief valve to open the latter.

4. A hydraulic actuating device for swinging a tiltable cabin of a vehicle about a horizontal axis, said device including a hydraulic cylinder and a piston slideable in said cylinder, a jacket surrounding said cylinder and forming an annular fluid reservoir with said cylinder, a plunger pump rigidly connected to said cylinder and located between said piston and the point of pivotal connection of said cylinder to said frame, said plunger pump including a body secured across said cylinder and closing the end thereof having a bore therein, a plunger slideably mounted in said bore and having an end extending from said bore, suction and pressure passages formed in said body and connecting said bore with said interior of said cylinder and with said reservoir, a hand actuating lever pivotally mounted on said pump for actuating the latter, said actuating lever being pivotally supported at one end on said device and engaging at an intermediate point the pump plunger end which projects beyond the pump body, said actuating lever arranged so as to be movable in a plane extending at an acute angle with the longitudinal axis of the device, said cylinder and piston each having a pivot eye at their end for pivotal mounting to said vehicle and cabin respectively.

5. A device according to claim 4, characterized in that the actuating lever comprises a permanent portion pivotally connected to the pump body and to the pump plunger end, and an extension rod which may be removably slid onto the free end of said portion.

6. A device according to claim 5, characterized in that said pump has a normally closed relief valve, said extension rod being shiftable between two positions on the lever, namely a first position in which said extension rod engages a first abutment on the lever, said position corresponding to the normal operative position of the pump, and a second position in which the extension rod projects beyond the abutment on the lever into the path of said normally closed relief valve of the pump, to actuate said valve.

* * * * *